US009653937B2

(12) United States Patent
Hoda et al.

(10) Patent No.: US 9,653,937 B2
(45) Date of Patent: May 16, 2017

(54) POWER SUPPLYING APPARATUS, POWER RECEIVING APPARATUS, ELECTRICAL VEHICLE, CHARGING SYSTEM, AND CHARGING METHOD

(71) Applicant: Hitachi, Ltd., Chiyoda-ku, Tokyo (JP)

(72) Inventors: Isao Hoda, Tokyo (JP); Hitoshi Akiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 14/440,889

(22) PCT Filed: Jan. 27, 2014

(86) PCT No.: PCT/JP2014/051605
§ 371 (c)(1),
(2) Date: May 6, 2015

(87) PCT Pub. No.: WO2014/132716
PCT Pub. Date: Sep. 4, 2014

(65) Prior Publication Data
US 2015/0303730 A1  Oct. 22, 2015

(30) Foreign Application Priority Data
Feb. 27, 2013  (JP) ................................ 2013-036582

(51) Int. Cl.
*H02J 7/00* (2006.01)
*H02J 5/00* (2016.01)
(Continued)

(52) U.S. Cl.
CPC ......... *H02J 7/0072* (2013.01); *B60L 11/1805* (2013.01); *B60L 11/1816* (2013.01);
(Continued)

(58) Field of Classification Search
CPC ............... H02J 17/00; H02J 2007/0059; H02J 2007/0096; H02J 5/005; H02J 7/0052; H02J 7/0072; H02J 7/025; H04B 15/00
(Continued)

(56) References Cited

U.S. PATENT DOCUMENTS 4,882,120 A * 11/1989 Roe et al. ......... H02M 7/53875
363/37
5,297,015 A *  3/1994 Miyazaki et al. ........ H02J 3/00
307/151
(Continued)

FOREIGN PATENT DOCUMENTS

JP    06-343205 A    12/1994
JP    H06-343205 A   12/1994
(Continued)

OTHER PUBLICATIONS

European search report for related European application No. 14757303.4 dated Aug. 29, 2016.

*Primary Examiner* — Sun Lin
(74) *Attorney, Agent, or Firm* — Miles & Stockbridge P.C.

(57) ABSTRACT

It is an object of the present invention to provide a power supplying apparatus, a power receiving apparatus, an electrical vehicle, a charging system, and a charging method, the power feeding apparatus improving reliability by suppressing any decrease in charging efficiency and making charging control communication more resistant to high-frequency noise of a switching element. A power supplying apparatus for feeding power to an external apparatus, wherein the power supplying apparatus is characterized in having a power conversion unit, a power supplying unit, a control unit, and a communication unit. The power conversion unit includes a power conversion switching element capable of changing the a switching waveform of the switching ele- (Continued)

ment. The power supplying unit supplies power to the external apparatus, the power being generated in the power conversion unit. The communication unit communicates with the external apparatus. The control unit conducts a control so as to adjust the switching waveform of the switching element in the power conversion unit during a period in which the communication unit communicates with the external apparatus.

17 Claims, 7 Drawing Sheets

(51) Int. Cl.
| | | |
|---|---|---|
| *H02J 17/00* | (2006.01) | |
| *H02J 7/02* | (2016.01) | |
| *B60L 11/18* | (2006.01) | |
| *H02M 1/44* | (2007.01) | |
| *H04B 15/00* | (2006.01) | |
| *H02M 7/48* | (2007.01) | |
| *H02M 1/00* | (2006.01) | |

(52) U.S. Cl.
CPC ....... *B60L 11/1846* (2013.01); *B60L 11/1861* (2013.01); *H02J 5/005* (2013.01); *H02J 7/0004* (2013.01); *H02J 7/0052* (2013.01); *H02J 7/025* (2013.01); *H02J 17/00* (2013.01); *H02M 1/44* (2013.01); *H04B 15/00* (2013.01); *B60L 2210/10* (2013.01); *B60L 2210/30* (2013.01); *B60L 2210/40* (2013.01); *B60L 2240/547* (2013.01); *B60L 2240/549* (2013.01); *B60L 2240/80* (2013.01); *B60L 2270/147* (2013.01); *H02J 2007/0059* (2013.01); *H02J 2007/0096* (2013.01); *H02M 7/48* (2013.01); *H02M 2001/0029* (2013.01); *Y02T 10/705* (2013.01); *Y02T 10/7005* (2013.01); *Y02T 10/7044* (2013.01); *Y02T 10/7072* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 5,657,326 | A | 8/1997 | Burns et al. | |
| 6,160,443 | A * | 12/2000 | Maalej et al. | ........ H04L 1/0057 |
| | | | | 329/304 |
| 8,093,758 | B2 * | 1/2012 | Hussmann et al. | ..... H02J 5/005 |
| | | | | 307/105 |
| 9,099,885 | B2 * | 8/2015 | Kamata | .................... H02J 7/025 |
| 9,478,992 | B2 * | 10/2016 | Hosotani | ................ H02J 5/005 |
| 2012/0153894 | A1 | 6/2012 | Widmer | |
| 2012/0286752 | A1 | 11/2012 | Tsukiji et al. | |
| 2013/0027078 | A1 * | 1/2013 | Nakano et al. | ...... H04B 5/0037 |
| | | | | 324/764.01 |
| 2014/0145514 | A1 * | 5/2014 | Konno et al. | ......... B60L 11/182 |
| | | | | 307/104 |
| 2015/0091387 | A1 * | 4/2015 | Okazaki | ................ H02J 7/025 |
| | | | | 307/104 |

FOREIGN PATENT DOCUMENTS

| | | |
|---|---|---|
| JP | 2001-197736 A | 7/2001 |
| JP | 2008-206297 A | 9/2008 |
| JP | 2009-089520 A | 4/2009 |
| JP | 2010-148190 A | 7/2010 |
| JP | 2012-029527 A | 2/2012 |

* cited by examiner

POWER SUPPLYING APPARATUS, POWER RECEIVING APPARATUS, ELECTRICAL VEHICLE, CHARGING SYSTEM, AND CHARGING METHOD

TECHNICAL FIELD

The present invention relates to a power feeding apparatus, a power receiving apparatus, an electrical vehicle, a charging system, and a charging method.

BACKGROUND ART

As a background art of the present technical field, JP-A-6-343205 (Patent Literature 1) is known. JP-A-6-343205 describes "a battery controller that determines whether communication of charging information is necessary or unnecessary and a charger controller that stops charging when it is determined that the communication of the charging information is necessary and performs the charging when it is determined that the communication is unnecessary are included in a charging apparatus of an electrical vehicle charging a vehicle-mounted battery on the basis of the charging information exchanged between a charger and the vehicle-mounted battery, to prevent erroneous transmission of information at the time of communicating the charging information between the battery and the charger," (refer to Abstract).

CITATION LIST

Patent Literature

Patent Literature 1: JP-A-6-343205

SUMMARY OF INVENTION

Technical Problem

In Patent Literature 1, a structure of the charging apparatus of the electrical vehicle to prevent the erroneous transmission of the information at the time of communicating the charging information between the battery and the charger is described. However, the charging apparatus of the electrical vehicle of Patent Literature 1 needs to stop the charging when it is determined that the communication of the charging information is necessary. In addition, charging efficiency is degraded by stopping the charging to suppress communication interference and a time needed until the charging ends increases, which results in decreasing convenience to a user.

Accordingly, an object of the present invention is to provide a power feeding apparatus, a power receiving apparatus, an electrical vehicle, a charging system, and a charging method that can suppress charging efficiency from being degraded, improve tolerance of communication for charging control against harmonic noise of a switching element, and improve reliability.

Solution to Problem

In order to resolve the above problems, configurations described in CLAIMS are adopted.

The present application includes a plurality of means for resolving the above problems. For example, there is provided a power feeding apparatus for feeding power to an external apparatus. The power feeding apparatus includes a power converting unit that has a switching element for power conversion capable of changing a switching waveform; a power feeding unit that supplies power generated by the power converting unit to the external apparatus; a control unit; and a communication unit that performs communication with the external apparatus. Control is performed by the control unit such that the switching waveform of the switching element in the power converting unit is adjusted, in a period in which the communication unit performs communication with the external apparatus.

Advantageous Effects of Invention

According to the present invention, a power feeding apparatus, a power receiving apparatus, an electrical vehicle, a charging system, and a charging method that can suppress charging efficiency from being degraded, improve tolerance of communication for charging control against harmonic noise of a switching element, and improve reliability can be provided.

DESCRIPTION OF EMBODIMENTS

Figure 1:
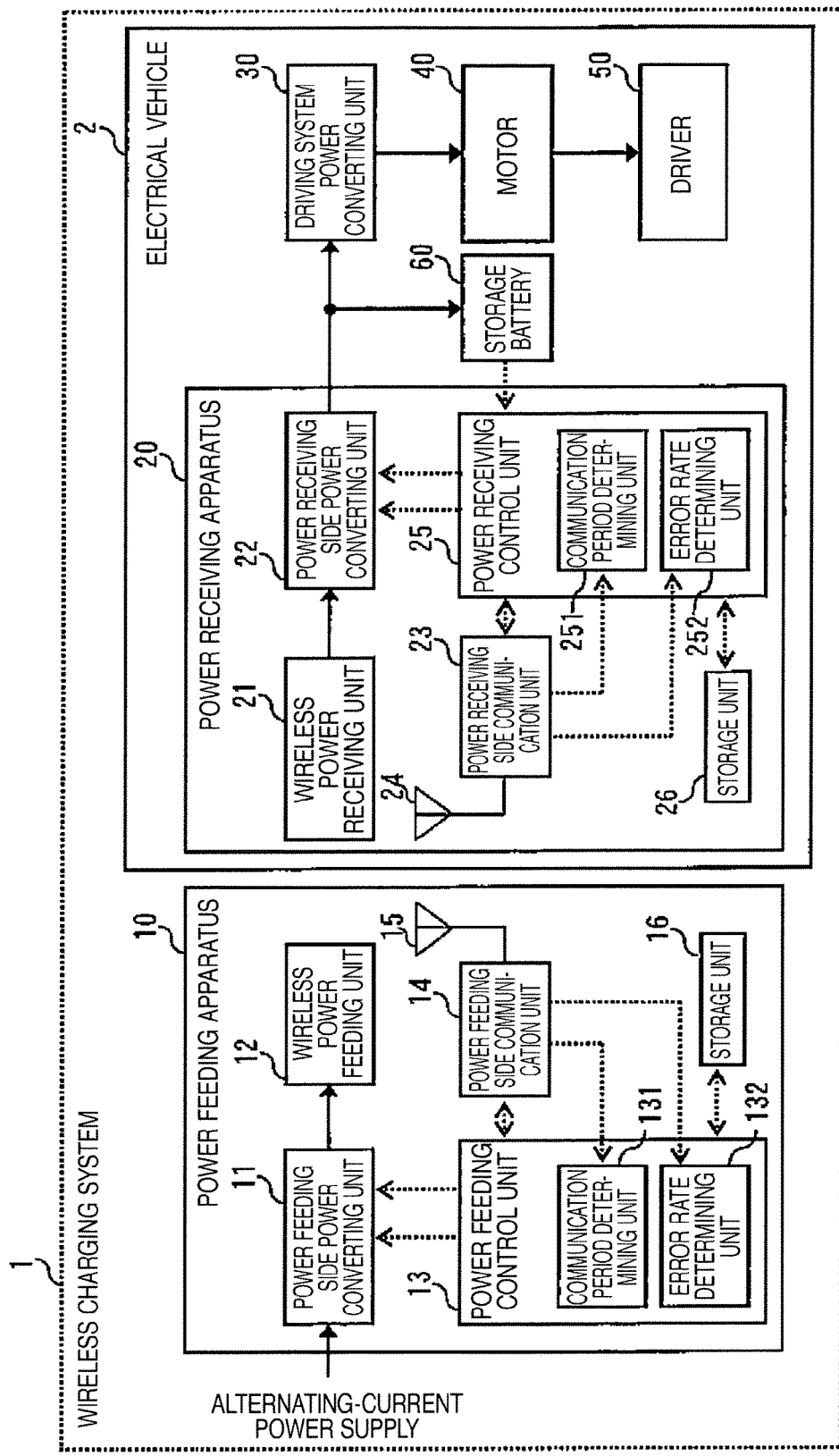
FIG. 1 is an exemplary configuration diagram of a wireless charging system on which a power feeding apparatus and a power receiving apparatus according to an embodiment of the present invention are mounted.

Hereinafter, embodiments will be described using the drawings. In the drawings, the same reference numeral denotes the same or equivalent portion. In addition, the present invention is not limited to examples illustrated in the drawings.

First Embodiment

In this embodiment, an example of a wireless charging system that performs charging for a storage battery mounted on an electrical vehicle by wireless power feeding capable of feeding power from a charging device to the electrical vehicle without connection by a connector will be described.

FIG. 1 is an exemplary configuration diagram of a wireless charging system on which a power converting device according to an embodiment of the present invention is mounted. In FIG. 1, a wireless charging system 1 includes a power feeding apparatus 10 that supplies power to the outside and an electrical vehicle 2 having a power receiving apparatus 20 that receives power from the outside. In this embodiment, the charging system having the power feeding apparatus and the power receiving apparatus will be described using an operation of the case in which the power feeding apparatus 10 for the electrical vehicle is arranged in a charging station or a parking lot of a public facility and the power receiving apparatus 20 receives power supply from the power feeding apparatus 10 and charges the electrical vehicle 2 as an example.

The power feeding apparatus 10 includes a power feeding side power converting unit 11 including a power converting device, a wireless power feeding unit 12, a power feeding control unit 13, a power feeding side communication unit 14, an antenna 15, and a storage unit 16. In addition, the power feeding control unit 13 includes a communication period determining unit 131 and an error rate determining unit 132.

Meanwhile, the electrical vehicle 2 includes the power receiving apparatus 20, a driving system power converting unit 30, a motor 40, a driver 50, and a storage battery 60.

In addition, the power receiving apparatus 20 includes a wireless power receiving unit 21, a power receiving side power converting unit 22 including a power converting device, a power receiving side communication unit 23, an antenna 24, a power receiving control unit 25, and a storage unit 26. In addition, the power receiving control unit 25 includes a communication period determining unit 251 and an error rate determining unit 252

Each of the wireless power feeding unit 12 in the power feeding apparatus 10 and the wireless power receiving unit 21 in the power receiving apparatus 20 of the electrical vehicle 2 is formed by a coil and power is transmitted by mutual induction when the individual coils face in an axial direction. Hereinafter, an operation of the case of using wireless power transmission of an electromagnetic induction method will be described.

First, the power feeding side power converting unit 11 in the power feeding apparatus 10 converts a frequency for alternating-current power of system power supplied from the outside, for example, three-phase alternating-current power 200 V by power conversion using a switching element, generates a high frequency signal, and supplies the high frequency signal to the wireless power feeding unit 12.

Next, the wireless power feeding unit 12 in the power feeding apparatus 10 generates a magnetic flux in the axial direction of the coil by the high frequency signal supplied from the power feeding side power converting unit 11. Meanwhile, in the wireless power receiving unit 21 in the power receiving apparatus 20 of the electrical vehicle 2, a high frequency signal is generated in the power receiving coil by induced electromotive force based on mutual induction with the magnetic flux generated by the power feeding coil of the wireless power feeding unit 12 and the high frequency signal is supplied to the power receiving side power converting unit 22.

The power receiving side power converting unit 22 generates direct-current power from the supplied high frequency signal by the power conversion using the switching element and supplies the direct-current power to the storage battery 60. The storage battery 60 holds the direct-current power supplied from the power receiving side power converting unit 22 in the storage battery. Meanwhile, when the electrical vehicle 2 travels, a motor driving signal is generated by the driving system power converting unit 30 using the direct-current power held in the storage battery 60 and the motor 40 is driven. In addition, the motor 40 rotates the driver 50 such as wheels and travels the electrical vehicle.

The power feeding control unit 13 generates a current command value of the high frequency signal output from the power feeding side power converting unit 11 in the power feeding apparatus 10 and transition time setting regarding an internal operation, supplies the current command value and the transition time setting to the power feeding side power converting unit 11, and performs control. In addition, the power receiving control unit 25 sets an voltage command value of the direct-current power output from the power receiving side power converting unit 22 in the power receiving apparatus 20 of the electrical vehicle 2 and transition time setting regarding an internal operation, supplies the voltage command value and the transition time setting to the power receiving side power converting unit 22, and performs control. Here, the transition time is a rising or falling time of a time waveform of a control signal.

Next, a communication interface of the power feeding apparatus 10 to control an operation from a charging start to a charging end and the power receiving apparatus 20 of the electrical vehicle 2 will be described. In FIG. 1, the power feeding control unit 13 of the power feeding apparatus 10 and the power receiving control unit 25 of the power receiving apparatus 20 transmit and receive a start request or a stop request of a charging operation, storage battery information of the electrical vehicle 2 (a battery capacity, a maximum charging time, and a current command value at the time of charging based on a battery state), and information of charger information (a maximum current) of the power feeding apparatus 10 by wireless communication through the power feeding side communication unit 14 and the power receiving side communication unit 23.

When information is transmitted from the power feeding apparatus 10 to the power receiving apparatus 20 of the electrical vehicle 2, the power feeding control unit 13 of the power feeding apparatus 10 generates data to be transmitted to the power receiving apparatus 20 of the electrical vehicle 2 and supplies the data to the power feeding side communication unit 14. The power feeding side communication unit 14 executes encoding and modulation processing on the supplied data and transmits a high frequency signal (RF signal) from the antenna 15.

Meanwhile, the power receiving side communication unit 23 of the power receiving apparatus 20 amplifies or attenuates the RF signal received by the antenna 24 of the power receiving apparatus 20 such that a signal level of the RF signal becomes a desired signal level, executes frequency conversion and demodulation and decoding processing, and supplies the received data to the power receiving control unit 25. At this time, in the power receiving side communication unit 23 of the power receiving apparatus 20, auto gain control (AGC) is performed such that the signal level of the RF signal received by the antenna 24 becomes the desired signal level and it can be determined whether the RF signal is transmitted from the antenna 15 of the power feeding apparatus 10 and is received by the antenna 24 of the power receiving apparatus 20, by a voltage value change of an AGC control signal. The power receiving control unit 25 supplies the AGC control signal to the communication period determining unit 251 and it is determined by the communication period determining unit 251 whether communication is performed.

In addition, the power receiving side communication unit 23 detects an error bit number of the demodulated and decoded received data in one data packet and supplies the error bit number to the error rate determining unit 252 of the power receiving control unit 25. The error rate determining unit 252 calculates a received data error rate from the supplied error bit number and the reception number of times of data managed by the power receiving control unit 25.

Next, the case in which information is transmitted from the power receiving control unit 25 of the power receiving apparatus 20 to the power feeding apparatus 10 will be described At this time, the power receiving control unit 25 of the power receiving apparatus 20 generates data to be transmitted to the power feeding apparatus 10 and supplies the data to the power receiving side communication unit 23 The power receiving side communication unit 23 executes encoding and modulation processing on the supplied data and transmits an RE signal from the antenna 24.

Meanwhile, the power feeding side communication unit 14 of the power feeding apparatus 10 amplifies or attenuates the RF signal received by the antenna 15 of the power feeding apparatus 1 0 such that a signal level of the RE signal becomes a desired signal level, executes frequency conversion and demodulation and decoding processing, and supplies the received data to the power feeding control unit 13. At this time, in the power feeding side communication unit 14 of the power feeding apparatus 10, the auto gain control (AGC) is performed such that the signal level of the RE signal received by the antenna 15 becomes the desired signal level and it can be determined whether the RF signal is transmitted from the antenna 24 of the power receiving apparatus 20 and is received by the antenna 15 of the power feeding apparatus 10, by a voltage value change of an AGC control signal. The power feeding control unit 13 supplies the AGC control signal to the communication period determining unit 131 of the power feeding control unit 13 and it is determined by the communication period determining unit 251 whether communication is performed.

In addition, the power feeding side communication unit 14 detects an error bit number of the demodulated and decoded received data in one data packet and supplies the error bit number to the error rate determining unit 132 of the power feeding control unit 13. The error rate determining unit 132 calculates a received data error rate from the supplied error bit number and the reception number of times of data managed by the power feeding control unit 13.

The power feeding control unit 13 of the power feeding apparatus 10 of FIG. 1 can store information such as the current command value and the transition time setting set to the power feeding side power converting unit 11, the error bit number or the reception error rate acquired by the error rate determining unit 132, and a mid-communication transition time fixation flag in the storage unit 16 and call the information. The storage unit 16 is a non-volatile storage unit and holds the information even when power is not supplied.

The power receiving control unit 25 of the power receiving apparatus 20 of FIG. 1 can store information such as the current command value and the transition time setting set to the power receiving side power converting unit 22, the error bit number or the reception error rate acquired by the error rate determining unit 252, and a mid-communication transition time fixation flag in the storage unit 26 and call the information. The storage unit 26 is a non-volatile storage unit and holds the information even when power is not supplied.

Figure 2:
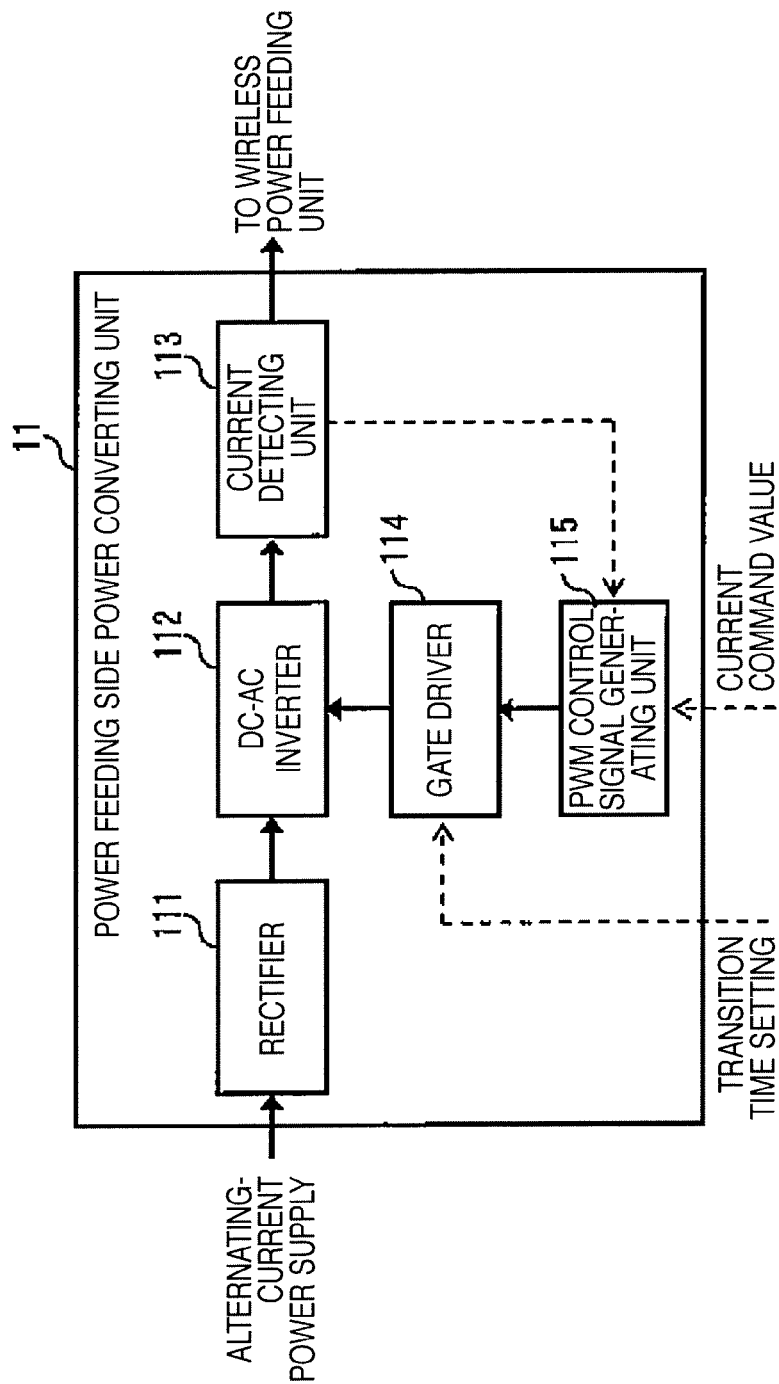
FIG. 2 is an exemplary configuration diagram of a power converting unit in the power feeding apparatus according to the embodiment of the present invention.

Next, a configuration of the power feeding side power converting unit 11 in the power feeding apparatus 10 will be described using FIG. 2. FIG. 2 is an exemplary configuration diagram of the power converting unit in the power feeding apparatus according to the embodiment of the present invention. In FIG. 2, the power feeding side power converting unit 11 includes a rectifier 111, a DC-AC inverter 112, a current detecting unit 113, a gate driver 114, and a PWM control signal generating unit 115.

In FIG. 2, the rectifier 111 of the power feeding side power converting unit 11 generates direct-current power from alternating-current power of system power supplied from the outside, for example, three-phase alternating-current power 200 V by rectification and smoothing by a diode and supplies the direct-current power to the DC-AC inverter 112. The DC-AC inverter 112 is a switching element for power conversion and converts the supplied direct-current power into an alternating-current signal of a frequency suitable for wireless power transmission, for example, 10 kHz to 100 kHz by an inverter circuit and supplies the alternating-current signal to the wireless power feeding unit 12 through the current detecting unit 113 In the current detecting unit 113, a current value of a signal used for the wireless power transmission is detected and the detected current value is supplied to the PWM control signal generating unit 115.

The alternating-current power of the system power supplied from the outside is not limited to the three-phase alternating-current power 200 V and various alternating-current powers such as single-phase alternating-current power 200 V and single-phase alternating-current power 100 V are assumed. A rectification circuit used by the rectifier 111 is configured according to a type of the alternating-current power. As the frequency of the alternating-current signal generated by the DC-AC inverter 112, 10 kHz to 100 kHz are exemplified. However, the frequency is not limited thereto.

In FIG. 2, the PWM control signal generating unit 115 compares the current command value supplied from the power feeding control unit 13 and the current value supplied from the current detecting unit 113, generates a PWM control signal such that the current value supplied from the current detecting unit 113 is matched with the current command value supplied from the power feeding control unit 13, and supplies the PWM control signal to the gate driver 114.

The gate driver 114 switches gate resistance of the switching element, on the basis of the transition time setting supplied from the power feeding control unit 13, and controls a transition time of a rising waveform and a falling waveform of a time waveform of a switching signal in the DC-AC inverter 112

A relation of the PWM control signal generated by the PWM control signal generating unit 115 and the time waveform of the switching signal output from the DC-AC inverter 112 to be switched by the transition time setting will be described using FIG. 3.

Figure 3:
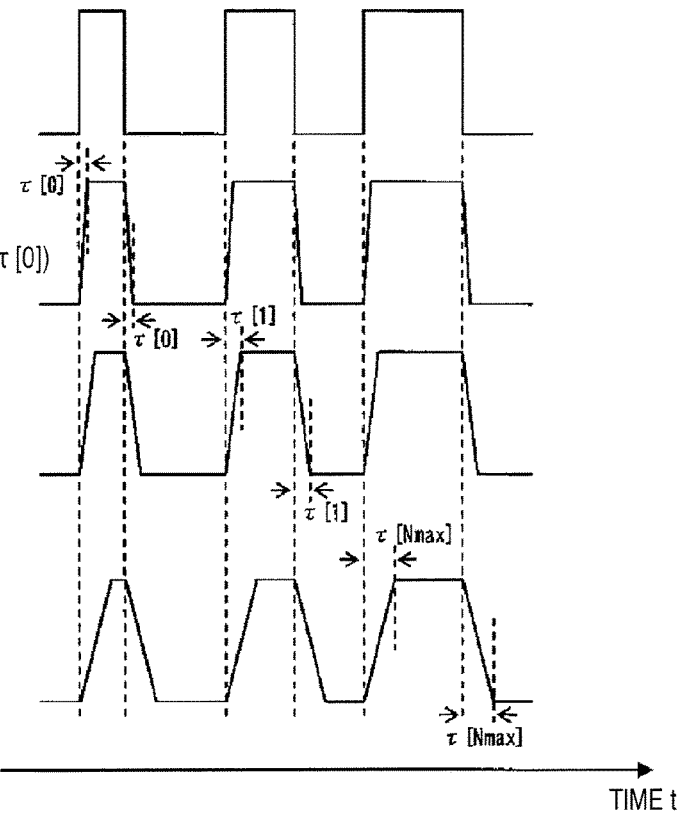
FIG. 3 is a diagram illustrating a relation of a PWM control signal and a transition time of a time waveform of a switching signal in a DC-AC inverter.

FIG. 3 is a diagram illustrating the relation of the PWM control signal and the transition time of the switching waveform in the DC-AC inverter. In FIG. 3, (a) illustrates an example of a waveform of the PWM control signal generated in the PWM control signal generating unit 115 in FIG. 2 and a pulse width is controlled according to a waveform of an alternating-current signal to be output by the power feeding side power converting unit 1 ON-OFF of the switching element of the DC-AC converter 112 is controlled on the basis of the PWM control signal and switching waveforms illustrated in (b) to (d) are generated.

Here, the transition time setting has command values ($\tau[0]$, $\tau[1]$ ... $\tau[Nmax]$) of (Nmax+1) types and a transition time of a rising waveform and a falling waveform is shortest in the case of $\tau[0]$, the transition time increases in order of $\tau[1]$ and $\tau[2]$, and the transition time is longest in the case of $\tau[Nmax]$. In FIG. 3, (b) illustrates a time waveform in the case in which the transition time setting is $\tau[0]$, (c) illustrates a time waveform in the case in which the transition time setting is τ[1], and (d) illustrates a time waveform in the case in which the transition time setting is τ[Nmax].

In a period in which communication for charging control is not performed, τ[0] having the shortest transition time among the transition times that can be set is designated as standard transition time setting. In addition, in a period in which the communication for the charging control is performed, the shortest transition time in the transition time settings in which communication interference does not occur due to harmonic noise is designated as optimal mid-communication transition time setting τ[k]. That is, as illustrated in the drawing, when the communication for the charging control is performed, the transition time is set long as compared with when the communication for the charging control is not performed. If the transition time of the switching waveform in the switching element increases, conversion loss of power increases and heat radiation increases. For this reason, the shortest transition time among the transition times that can be set is set as described above, so that harmonic components of the switching element can be suppressed.

Figure 4:
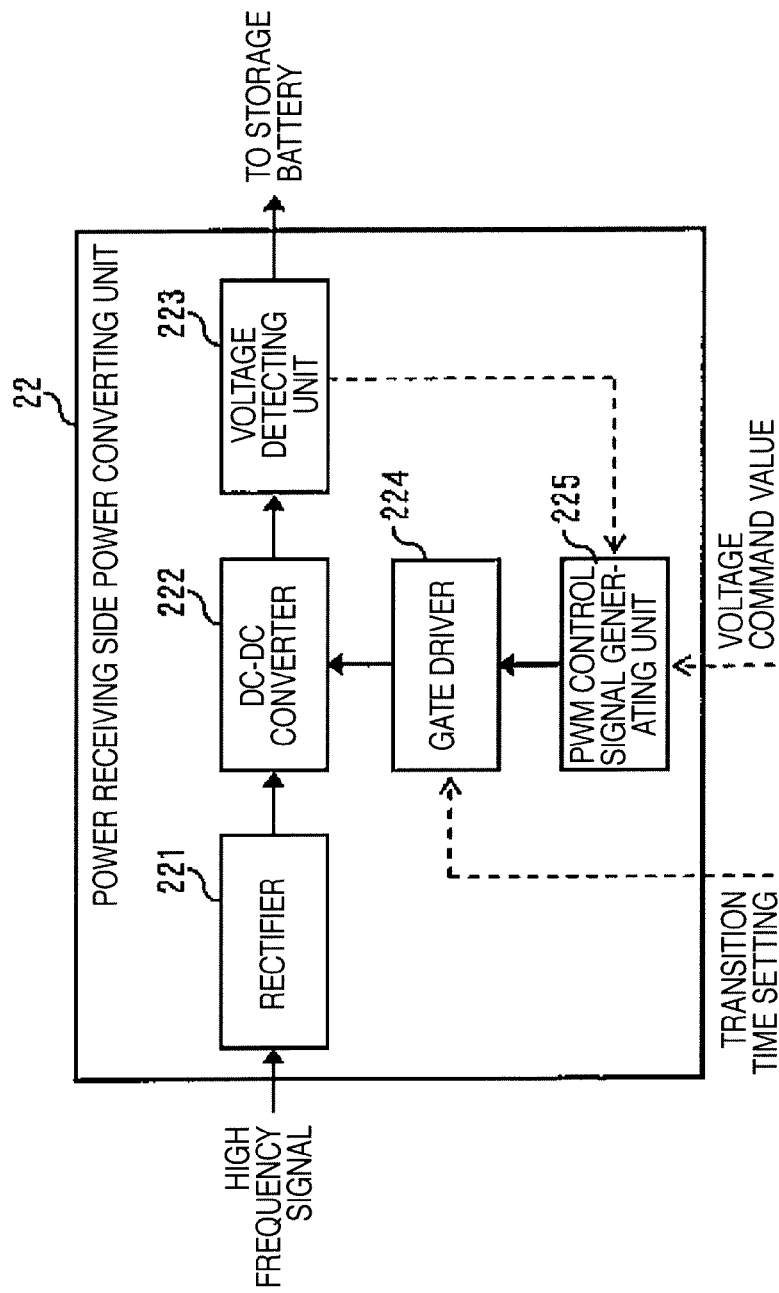
FIG. 4 is an exemplary configuration diagram of a power converting unit in the power receiving apparatus according to the embodiment of the present invention.

Next, a configuration of the power receiving side power converting unit 22 in the power receiving apparatus 20 will be described using FIG. 4. FIG. 4 is an exemplary configuration diagram of the power converting unit in the power receiving apparatus according to the embodiment or the present invention. In FIG. 4, the power receiving side power converting unit 22 includes a rectifier 221, a DC-DC converter 222, a voltage detecting unit 223, a gate driver 224, and a PWM control signal generating unit 225.

In FIG. 4, the rectifier 221 of the power receiving side power converting unit 22 generates direct-current power from a high frequency signal supplied from the wireless power receiving unit 21 by rectification and smoothing by a diode and supplies the direct-current power to the DC-DC converter 222 The DC-DC converter 222 is a switching element for power conversion and converts the supplied direct-current power into direct-current power of a voltage suitable for charging of the storage battery 60, for example, 240 V by an inverter circuit and supplies the direct-current power to the storage battery 60 through the voltage detecting unit 223. In the voltage detecting unit 223, a voltage value of the direct-current power used for the charging of the storage battery 60 is detected and the detected voltage value is supplied to the PWM control signal generating unit 225.

The frequency of the high frequency signal supplied from the wireless power receiving unit 21 is assumed as about 10 kHz to 100 kHz, but the frequency is not limited thereto. In addition, the voltage of the direct-current power generated by the DC-DC converter 222 is exemplified by 240 V, but various voltage values can be assumed according to a type of the connected storage battery 60.

In FIG. 4, the PWM control signal generating unit 225 compares the current command value supplied from the power receiving control unit 25 and the voltage value supplied from the voltage detecting unit 223, generates a PWM control signal such that the voltage value supplied from the voltage detecting unit 223 is matched with the voltage command value supplied from the power receiving control unit 25, and supplies the PWM control signal to the gate driver 224. The gate driver 224 switches gate resistance of the switching element, on the basis of the transition time setting supplied from the power receiving control unit 25, and controls a transition time of a rising waveform and a falling waveform of a time waveform of a switching signal in the DC-DC converter 222.

A relation of the PWM control signal generated by the PWM control signal generating unit 225 and the time waveform of the switching signal output from the DC-DC converter 222 to be switched by the transition time setting is the same as the relation of the PWM control signal and the transition time of the time waveform of the switching signal in the DC-AC inverter, described using FIG. 3, and explanation thereof is omitted.

In the wireless charging system 1 configured as described above, an operation for performing charging form the power feeding apparatus 10 arranged on a road to the electrical vehicle 2 will be described using FIGS. 5 to 7.

Figure 5:
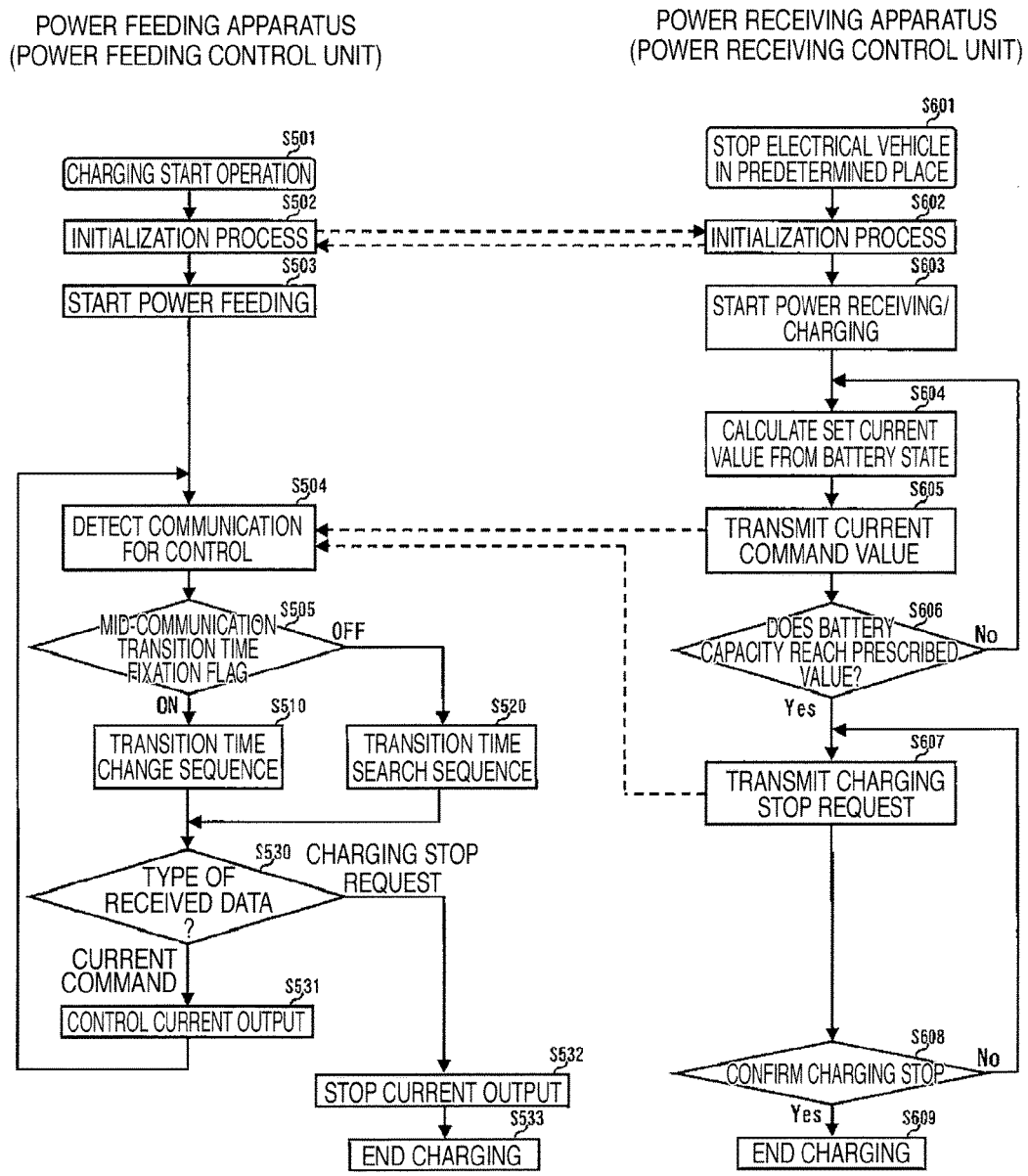
FIG. 5 is an operation sequence diagram of the wireless charging system.

FIG. 5 is a diagram of an entire operation sequence of the wireless charging system. In FIG. 5, a system for supplying power between a power feeding apparatus arranged on a road and a power receiving apparatus included in an electrical vehicle is assumed as an example of the wireless charging system. However, installation locations of the power feeding apparatus and the power receiving apparatus are not limited to a form illustrated in FIG. 5.

In FIG. 5, a left side shows an entire operation sequence in the power feeding apparatus 10 and a right side shows an operation sequence in the power receiving apparatus 20 of the electrical vehicle 2. First, a user of the electrical vehicle stops the electrical vehicle in a predetermined place (step S601) and operates the power feeding apparatus 10 arranged on the road and starts charging (S501).

Next, in steps 502 and S602, the power feeding control unit 13 of the power feeding apparatus 10 and the power receiving control unit 25 of the power receiving apparatus 20 exchange information (a maximum voltage and a maximum current) of the charging apparatus side and battery information (a maximum voltage, a battery capacity, a maximum charging time, and a charged battery capacity) of the electrical vehicle side through a communication interface and execute initialization processing such as mutual compatibility confirmation and proceed to steps S503 and S603.

During the initialization processing, the power conversion processing is not executed in both the power feeding side power converting unit 11 of the power feeding apparatus 10 and the power receiving side power converting unit 22 of the power receiving apparatus 20 and interference to communication for the charging control does not occur due to the harmonic noise components of the switching element. In steps S502 and S602, a current command value regarding charging is transmitted from the power receiving control unit 25 of the power receiving apparatus 20 to the power feeding control unit 13 of the power feeding apparatus 10. In step S503, the power feeding control unit 13 of the power feeding apparatus 10 starts power feeding on the basis of the current command value and proceeds to step S504. In step S603, the power receiving control unit 25 of the power receiving apparatus 20 receives power in the wireless power receiving unit 21 and starts charging for the storage battery 60 and proceeds to step S604.

In step S503, the power feeding control unit 13 of the power feeding apparatus 10 designates τ[0] to be the standard setting as the transition time setting to the power feeding side power converting unit 11. In step S603, the power receiving control unit 25 of the power receiving apparatus 20 designates τ[0] to be the standard setting as the transition time setting to the power receiving side power converting unit 22.

Next, in step S605, the power receiving control unit 25 of the power receiving apparatus 20 calculates a current command value suitable for charging on the basis of a charging state of the storage battery 60 and proceeds to step S605.

Next, in step S605, the power receiving control unit 25 of the power receiving apparatus 20 transmits the current command value to the power feeding control unit 13 of the power feeding apparatus 10 and proceeds to step S606.

Next, in step S606, the power receiving control unit 25 of the power receiving apparatus 20 determines whether a battery capacity charged in the storage battery 60 reached the prescribed value. When the battery capacity reached the prescribed value, that is, charging is completed, the power receiving control unit 25 proceeds to step S607 and when the battery capacity did not reach the prescribed value, that is, charging is not completed, the power receiving control unit 25 returns to step S604. Here, a loop of steps S604 to S606 is continued until charging for the storage battery 60 is completed and is executed at an interval of 100 ms. An execution time interval of the loop of steps S604 to S606 can be freely set.

Next, in step S607, after charging of the storage battery 60 is completed, the power receiving control unit 25 of the power receiving apparatus 20 transmits a charging stop request to the power feeding control unit 13 of the power feeding apparatus 10 and proceeds to step S608. Next, in step S608, the power receiving control unit 25 of the power receiving apparatus 20 determines whether power feeding for the storage battery 60 is stopped. When it cannot be confirmed that power feeding is stopped, the power receiving control unit 25 returns to step S607 and retransmits the charging stop request and when it can be confirmed that charging processing is stopped, the power receiving control unit 25 proceeds to step S609 and completes the charging processing.

As described above, if communication timing from the power receiving control unit 25 of the power receiving apparatus 20 to the power feeding control unit 13 of the power feeding apparatus 10 is limited to during charging, the timing becomes the transmission of the current command value in step S605 and the transmission of the charging stop request in step S607.

Hereinafter, an operation of the case will be described in which communication of the current command value or the charging stop request is received from the power receiving apparatus 20 to the power feeding apparatus 10 during feeding of the power.

First, in step S504, the power feeding control unit 13 of the power feeding apparatus 10 detects that the communication of the current command value or the charging stop request has been received from the power receiving apparatus 20 through the communication interface, by a voltage change of the AGC control signal in the communication period determining unit 131, and proceeds to step SS505.

In step S505, the power feeding control unit 13 of the power feeding apparatus 10 determines the mid-communication transition time fixation flag held in the storage unit 16. In the case of "ON", the power feeding control unit 13 proceeds to step S510 and in the ease of "OFF", the power feeding control unit 13 proceeds to step S520. The mid-communication transition time fixation flag is a flag set in a transition time search sequence of step S520 to be described below. The mid-communication transition time fixation flag shows whether transition time setting of a switching signal to suppress occurrence of interference to the communication for the charging control is fixed and shows fixation of the transition time setting in the case of "ON".

When the transition time setting is fixed during the communication, in step S510, the transition time of the switching signal waveform during the communication between the power feeding apparatus 10 and the power receiving apparatus 20 is made to be longer than the transition time of the switching signal waveform during non-communication, a sequence to suppress the interference to the communication for the charging control is executed, and the process proceeds to step S530. Meanwhile, in step S520, a sequence to search the transition time setting to be set by step S510 is executed and the process proceeds to step S530.

Next, in step S530, the power feeding control unit 13 of the power feeding apparatus 10 determines a type of the received data. When the type is the current command value, the power feeding control unit 13 proceeds to step S531 and when the type is the charging stop request, the power feeding control unit 13 proceeds to step S532.

Next, in step S531, the power feeding control unit 13 of the power feeding apparatus 10 supplies the received current command value to the power feeding side power converting unit 11, controls a current output to be fed, and returns to step S504. Meanwhile, in step S530, the power feeding control unit 13 of the power feeding apparatus 10 stops the conversion processing in the power feeding side power converting unit 11, stops the current output to be fed, proceeds to step S532, and ends the charging processing.

Here, a search operation of the transition time setting of the switching signal to suppress occurrence of the interference to the communication for the charging control in step S520 of FIG. 5 will be described using FIG. 6. FIG. 6 is a diagram of an operation sequence to search the transition time setting of the switching signal to suppress occurrence of the interference to the communication for the charging control.

Figure 6:
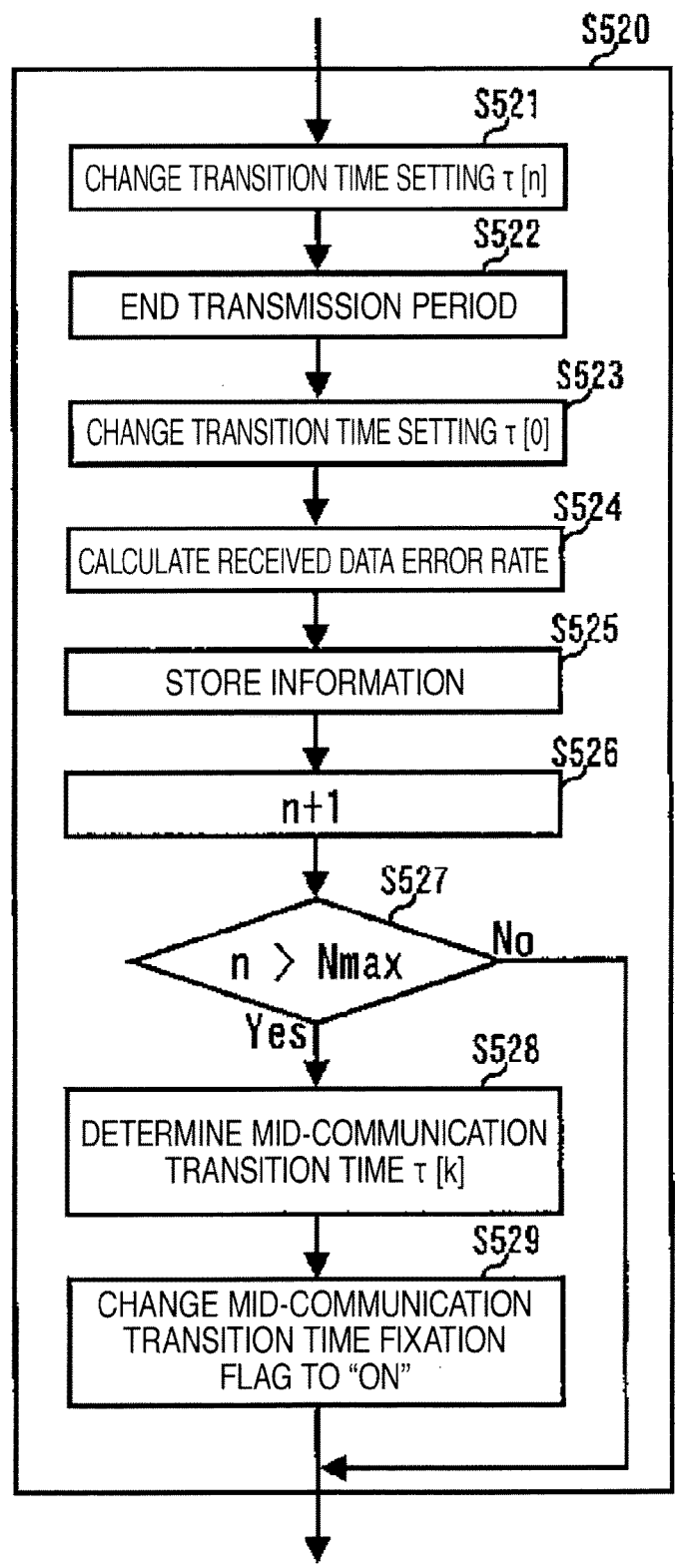
FIG. 6 is an operation sequence diagram to search switching signal transition time setting to suppress occurrence of interference to communication for charging control.

In step S521 of FIG. 6, the power feeding control unit 13 of the power feeding apparatus 10 designates the transition time setting as n-th $\tau[n]$, supplies the transition time setting to the power feeding side power converting unit 11, and proceeds to step S522. Here, n is an integer and n is 0 when charging starts. In step S526 to be described below, n is incremented.

Next, in step S522, the power feeding control unit 13 of the power feeding apparatus 10 detects that the communication of the current command value or the charging stop request transmitted from the power receiving apparatus 20 through the communication interface has ended, by a voltage change of the AGC control signal in the communication period determining unit 131, and proceeds to step S523. In step SS523, the power feeding control unit 13 of the power feeding apparatus 10 designates the transition time setting as the standard $\tau[0]$, supplies the transition time setting to the power feeding side power converting unit 11, and proceeds to step S524.

Next, in step S524, the power feeding control unit 13 of the power feeding apparatus 10 acquires a received data error rate from the error rate determining unit 132 and proceeds to step S525.

In step S525, the power feeding control unit 13 of the power feeding apparatus 10 stores the transition time setting set in step S521 and the received data error rate acquired in step S524 in the storage unit 16 and proceeds to step S526.

In step S526, the integer n to designate the transition time setting to be set by step S521 is incremented and the process proceeds to step S527.

In step S527, the power feeding control unit 13 of the power feeding apparatus 10 determines whether the integer n is larger than Nmax or not. When the integer n is larger than Nmax, the power feeding control unit 13 proceeds to step S528 and when the integer n is smaller than Nmax, the power feeding control unit 13 skips the search sequence and proceeds to step S530. In step S527, this corresponds to determine whether received data error rates for the transition time settings (τ[0], τ[1] . . . τ[Nmax]) of (Nmax+1) types have been acquired.

Next, in step S528, the power feeding control unit 13 of the power feeding apparatus 10 selects the transition time setting of the shortest transition time in the transition time settings in which the received data error rate is lower than a preset error rate, from received data error rate information for the transition time settings (τ[0], τ[1] . . . τ[Nmax]) of (Nmax+1) types stored in the storage unit 16, stores the transition time setting as an optimal mid-communication transition time setting value τ[k] in the storage unit 16, and proceeds to step S529.

In step S529, the power feeding control unit 13 of the power feeding apparatus 10 changes the mid-communication transition time fixation flag stored in the storage unit 16 to "ON", stores the mid-communication transition time fixation flag, skips the search sequence, and proceeds to step S530.

The transition time search sequence in step S520 to be described above is repeated (Nmax+1) times, so that a switching signal transition time setting value to suppress occurrence of interference to the communication for the charging control during the communication for the charging control in the wireless charging system can be acquired.

Here, an operation for changing the transition time during the communication for the charging control in step S510 of FIG. 5 will be described using FIG. 7. FIG. 7 is a diagram of an operation sequence to change switching transition time setting to suppress occurrence of the interference to the communication for the charging control.

Figure 7:
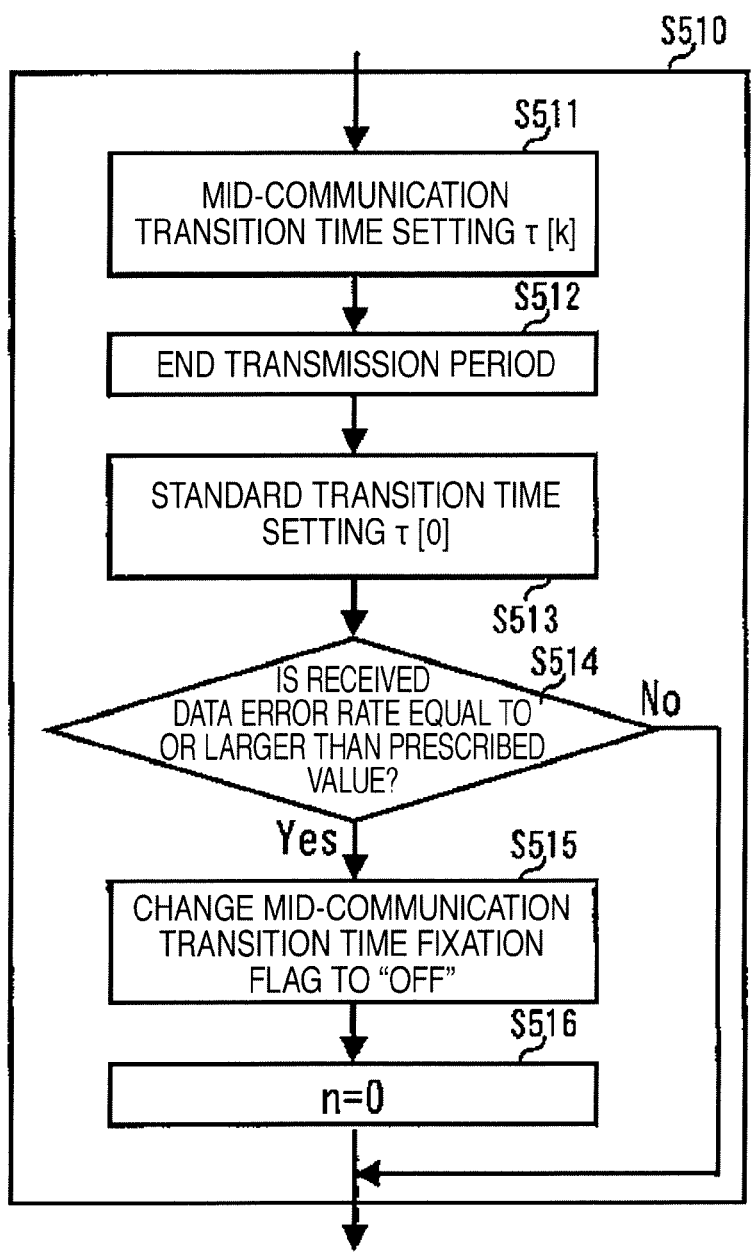
FIG. 7 is an operation sequence diagram to change switching transition time setting to suppress occurrence of interference to communication for charging control.

In step S511 of FIG. 7, the power feeding control unit 13 of the power feeding apparatus 10 sets the mid-communication transition time setting τ[k] searched by step S520 to the power feeding side power converting unit 11 and proceeds to step S512. In step S512, the power feeding control unit 13 of the power feeding apparatus 10 detects that the communication of the current command value or the charging stop request transmitted from the power receiving apparatus 20 through the communication interface has ended, by a voltage change of the AGC control signal in the communication period determining unit 131, and proceeds to step S513. In step SS513, the power feeding control unit 13 of the power feeding apparatus 10 sets the transition time setting as the standard τ[0] to the power feeding side power converting unit 11 and proceeds to step S514.

Next, in step S514, the power feeding control unit 13 of the power feeding apparatus 10 determines whether the received data error rate acquired by the error rate determining unit 132 is equal to or more than the prescribed value. When the received data error rate is equal to or more than the prescribed value, the power feeding control unit 13 determines that the interference to the communication for the charging control was suppressed in the transition time setting τ[k] set by step S511 and proceeds to step S515. When the received data error rate is smaller than the prescribed value, the power feeding control unit 13 skips the change sequence S510 and proceeds to step S530. Here, the prescribed value is 1%, for example. However, the prescribed value may be a value other than 0.

Next, in step S515, the power feeding control unit 13 of the power feeding apparatus 10 changes the mid-communication transition time fixation flag to "OFF", stores the mid-communication transition time fixation flag in the storage unit 16, and proceeds to step S516. In step S516, the power feeding control unit 13 of the power feeding apparatus 10 resets the integer n to designate the transition time setting to be set by step S521, skips the change sequence S510, and proceeds to step S530.

As described above, in the power converting device according to this embodiment, the reception error rate of the wireless communication for the charging control is evaluated for each transition time setting of the switching waveform immediately after starting charging and the transition time in which the harmonic noise is suppressed and the transition time in which the switching loss is small are set during only the transmission/reception period of the wireless communication for the charging control. Therefore, a power feeding apparatus, a power receiving apparatus, an electrical vehicle, a charging system, and a charging method that can suppress charging efficiency from being degraded, improve tolerance of communication for charging control against harmonic noise of an switching element, and improve reliability can be provided.

In addition, because the period in which the transition time of the switching waveform is increased is only the transmission/reception period of the wireless communication for the charging control, the heat radiation according to the increase in the switching loss can be suppressed as compared with the case in which the transition time is increased at all times. Therefore, a heat radiation design cost can be decreased.

The search of the transition time is performed immediately after starting the charging and the search of the transition time is performed again when the interference occurs in the wireless communication for the charging control during the normal charging operation. Therefore, it is possible to correspond to a change of a transmission/reception environment.

In this embodiment, the method of controlling the transition time by switching the gate resistance has been described as a means for changing the transition time in the switching waveform of the switching element. However, even when a method of controlling the transition time by connecting a variable capacitor to an output terminal of the switching element in parallel and a method of controlling the transition time by connecting a reactor and an auxiliary circuit including a capacitor and a power semiconductor, changing constants, and suppressing a resonance characteristic are used, the same effects can be obtained.

In addition, in this embodiment, even when the change of the AGC voltage has been used as a method of detecting the transmission/reception period of the communication for the charging control, but even when a synchronization method with periodic transmission of the current command value from the electrical vehicle and a method using a synchronization detection signal of the communication unit are used, the same effects can be obtained.

The present invention is not limited to the embodiments described above and various modifications are included in the present invention. For example, the embodiments are described in detail to facilitate the description of the present invention and are not limited to embodiments in which all of the described configurations are included. In addition, a part of the configurations of the certain embodiment can be replaced by the configurations of another embodiment or the configurations of another embodiment can be added to the configurations of the certain embodiment. In addition, for a part of the configurations of the individual embodiments, other configurations can be added, removed, or replaced.

In addition, a part or all of the individual configurations, functions, processing units, and processing means may be designed by integrated circuits and may be realized by hardware. In addition, the individual configurations and functions may be realized by software by analyzing programs for realizing the functions by a processor and executing the programs by the processor. Information such as the programs, the table, and the files for realizing the individual functions may be stored in a recording device such as a memory, a hard disk, and a solid state drive (SSD) or a recording medium such as an IC card, an SD card; and a DVD.

In addition, control lines or information lines that are necessary for explanation are illustrated and the control lines or information lines do not mean that all control lines or information lines are necessary for a product. In actuality, almost all configurations may be conceived to be connected to each other.

REFERENCE SIGNS LIST

1: wireless charging system
2: electrical vehicle
10: power feeding apparatus
11: power feeding side power converting unit
111: rectifier
112: DC-AC inverter
113: current detecting unit
114, 224: gate driver
115, 225: PWM control signal generating unit
12: wireless power feeding unit
13: power feeding control unit
131, 251: communication period determining unit
132, 252: error rate determining unit
14: power feeding side communication unit
15, 24: antenna
16, 26: storage unit
21: wireless power receiving unit
22: power receiving side power converting unit
222: DC-DC converter
223: voltage detecting unit
23: power receiving side communication unit
24: power receiving control unit
30: driving system power converting unit
40: motor
50: driver
60: storage battery

The invention claimed is:

1. A power feeding apparatus for feeding power to an external apparatus, the power feeding apparatus comprising:
a power converting unit that has a switching element for a power conversion capable of changing a switching waveform;
a power feeding unit that supplies power generated by the power converting unit to the external apparatus;
a control unit; and
a communication unit that performs communication with the external apparatus,
wherein a control is performed by the control unit such that the switching waveform of the switching element in the power converting unit is adjusted, in a period in which the communication unit performs communication with the external apparatus.

2. The power feeding apparatus according to claim 1, wherein the power converting unit includes a PWM (pulse width modulation) control signal generating unit that generates a switching waveform according to a current command value from the control unit and a gate driver that changes a switching transition time of the switching waveform generated by the PWM control signal generating unit, and
the gate driver is controlled by the control unit and a transition time of rising and falling of the switching waveform generated by the PWM control signal generating unit is adjusted.

3. The power feeding apparatus according to claim 2, wherein the control unit performs a control such that the transition time is set to a time longer than a transition time set in a period in which the communication unit does not perform communication with external world outside the power feeding apparatus.

4. The power feeding apparatus according to claim 3, wherein the control unit has at least one setting value for the transition time of the rising and the falling of the switching waveform of the switching element,
the power feeding apparatus includes an error rate acquiring unit that acquires an error rate of received data in the communication unit, and
the control unit performs a control such that an error rate for each setting value of the transition time included in the control unit is acquired by the error rate acquiring unit.

5. The power feeding apparatus according to claim 4, wherein the gate driver is controlled by the control unit, such that a shortest transition time in setting values of the transition time in which the error rate is lower than an error rate set as a base is set to the transition time of the switching waveform, based on the error rate acquired by the error rate acquiring unit.

6. The power feeding apparatus according to claim 5, further comprising:
a communication period determining unit that determines a period in which the communication unit performs communication with external world outside the power feeding apparatus,
wherein the communication period determining unit determines a communication period, based on an AGC (auto gain control) control signal in the communication unit.

7. A power receiving apparatus for receiving power from an external apparatus, the power receiving apparatus comprising:
a power converting unit that has a switching element for a power conversion capable of changing a switching waveform;
a power receiving unit that transmits external power to the power converting unit;
a control unit; and
a communication unit that performs communication with the external apparatus,
wherein a control is performed by the control unit such that the switching waveform of the switching element in the power converting unit is adjusted, in a period in which the communication unit performs communication with the external apparatus.

8. The power receiving apparatus according to claim 7, wherein the power converting unit includes a PWM (pulse width modulation) control signal generating unit that generates a switching waveform according to a current command value from the control unit and a gate driver that changes a switching transition time of the switching waveform generated by the PWM control signal generating unit, and the gate driver is controlled by the control unit and a transition time of rising and falling of the switching waveform generated by the PWM control signal generating unit is adjusted.

9. The power receiving apparatus according to claim 8, wherein the control unit performs a control such that the transition time is set to a time longer than a transition time set in a period in which the communication unit does not perform communication with external world outside the power receiving apparatus.

10. The power receiving apparatus according to claim 9, wherein the control unit has at least one setting value for the transition time of the rising and the falling of the switching waveform of the switching element,
the power receiving apparatus includes an error rate acquiring unit that acquires an error rate of received data in the communication unit, and
the control unit performs a control such that an error rate for each setting value of the transition time included in the control unit is acquired by the error rate acquiring unit.

11. The power receiving apparatus according to claim 10, wherein the gate driver is controlled by the control unit, such that a shortest transition time in setting values of the transition time in which an error rate is lower than an error rate set as a base is set to the transition time of the switching waveform, based on the error rate acquired by the error rate acquiring unit.

12. The power receiving apparatus according to claim 11, further comprising:
a communication period determining unit that determines a period in which the communication unit performs communication with external world outside the power receiving apparatus,
wherein the communication period determining unit determines a communication period, based on an AGC (auto gain control) control signal in the communication unit.

13. An electrical vehicle comprising:
the power receiving apparatus according to claim 7; and
a storage battery storing power supplied from the power receiving apparatus.

14. A charging system comprising:
a power feeding apparatus ;
a power receiving apparatus; and
storage means storing power supplied from the power receiving apparatus,
wherein the power feeding apparatus includes:
a first power converting unit that has a switching element for a power conversion capable of changing a switching waveform;
a power feeding unit that supplies power generated by the first power converting unit to the power receiving apparatus;
a first control unit; and
a first communication unit that performs communication with the power receiving apparatus,
the first control unit performing a control such that the switching waveform of the switching element in the first power converting unit is adjusted in a period in which the first communication unit performs communication with the power receiving apparatus; and
wherein the power receiving apparatus includes:
a second power converting unit that has a switching element for a power conversion capable of changing a switching waveform;
a power receiving unit that transmits power received from the power feeding apparatus to the second power converting unit;
a second control unit; and
a second communication unit that performs communication with the power feeding apparatus,
the second control unit performing a control such that the switching waveform of the switching element in the second power converting unit is adjusted in a period in which the second communication unit performs communication with the power feeding apparatus.

15. A charging method for receiving power from a power feeding apparatus by using a power receiving apparatus and storing the power in storage means,
wherein a waveform of a switching element associated with each of the power feeding apparatus and the power receiving apparatus is adjusted by each of the power feeding apparatus and the power receiving apparatus, in a period in which the power feeding apparatus and the power receiving apparatus perform communication.

16. The charging method according to claim 15, wherein each of the power feeding apparatus and the power receiving apparatus performs a control such that a transition time of rising and falling of a switching waveform of the switching element of each of the power feeding apparatus and the power receiving apparatus is adjusted.

17. The charging method according to claim 16, wherein each of the power feeding apparatus and the power receiving apparatus acquires an error rate in each transition time set to the transition time of the switching waveform of the switching element of each of the power feeding apparatus and the power receiving apparatus, adjusts a shortest transition time in transition times in which an error rate is lower than an error rate set as a base to the transition time of the switching waveform, and controls the switching waveform of the switching element.

* * * * *